March 1, 1955   A. STRASZAK   2,702,997
EGG CUP
Filed April 2, 1952   2 Sheets-Sheet 1
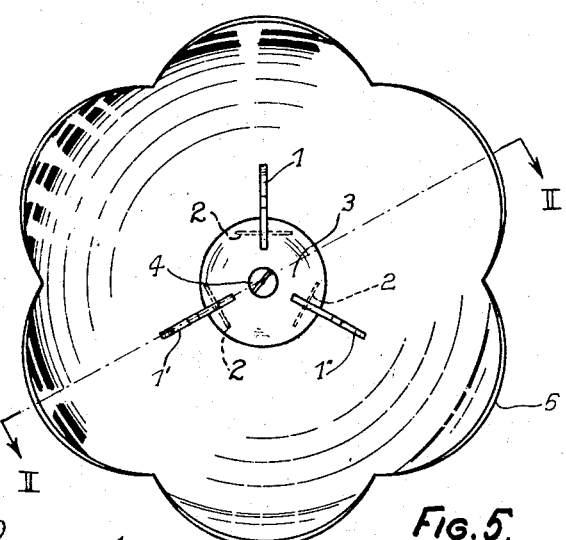
Fig. 1.
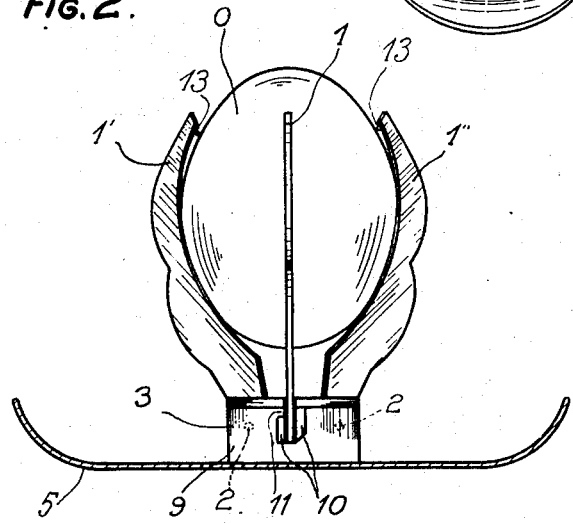
Fig. 2.
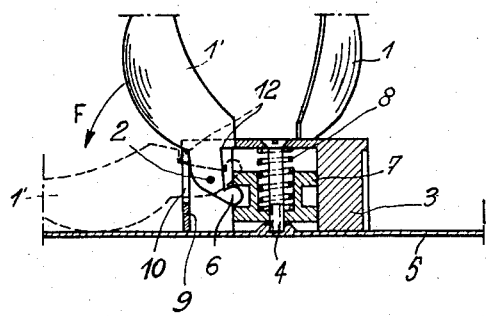
Fig. 3.
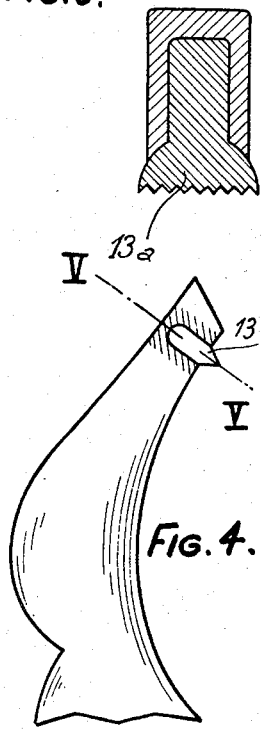
Fig. 5.
Fig. 4.
Inventor
Alois Straszak
By Robert E. Burns
Attorney March 1, 1955   A. STRASZAK   2,702,997
EGG CUP
Filed April 2, 1952   2 Sheets-Sheet 2
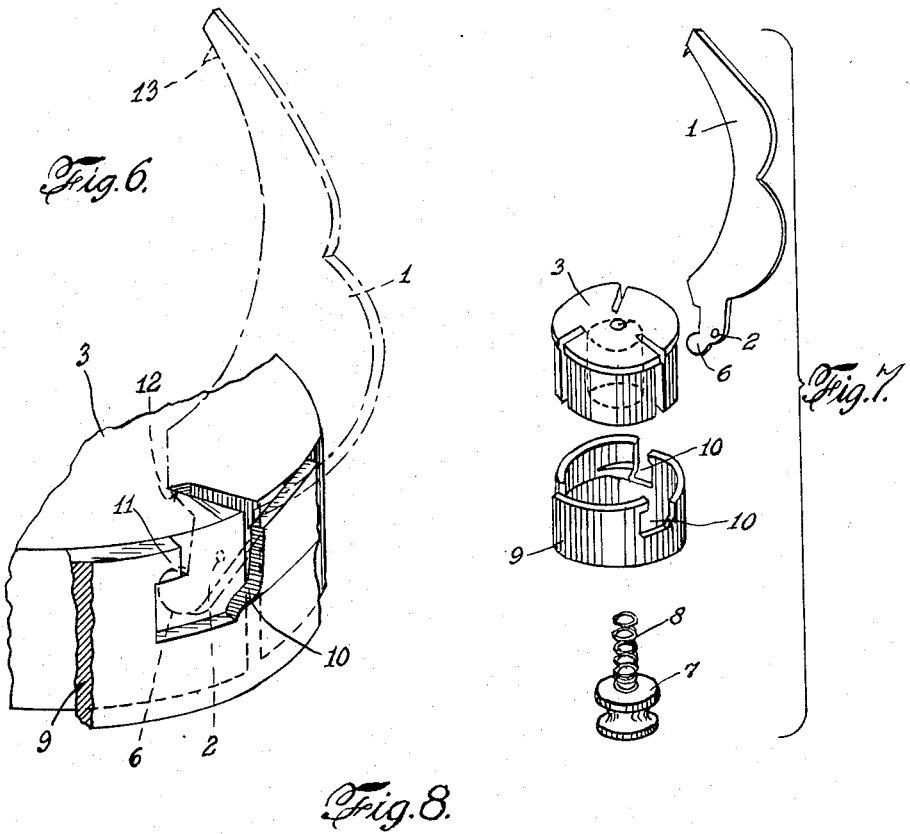
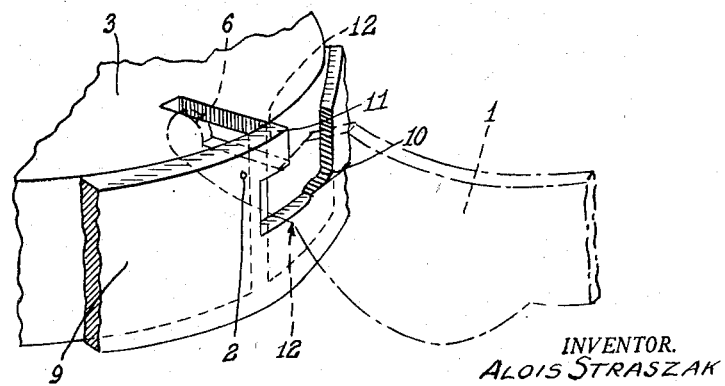
INVENTOR.
ALOIS STRASZAK
BY Robert E. Burns
ATTORNEY.

United States Patent Office 2,702,997
Patented Mar. 1, 1955

2,702,997

EGG CUP

Alois Straszak, Bois-Colombes, France

Application April 2, 1952, Serial No. 280,077

Claims priority, application France April 11, 1951

4 Claims. (Cl. 65—22)

The present invention relates to improvement in egg-cups.

The device according to the invention consists in a group of elastic pincers forming a cradle for the egg constructed so as to move, more or less elastically, following the shape of the egg and can be set in the position open or shut as required.

The invention can be well understood by referring to the following description corresponding to the attached drawings on which:

Fig. 1 represents a top view of the device according to the invention.

Fig. 2 represents a lateral view showing the blocked position of the pincers.

Fig. 3 represents, to a large scale a section along II—II of Fig. 1.

Fig. 4 is a view to a large scale, of a modification of the extremity of the pincer.

Fig. 5 is a modification according to a transverse section along V—V of Fig. 4 but on an enlarged scale.

Fig. 6 is an enlarged fragmentary perspective view showing the mounting of one of the pincers.

Fig. 7 is an exploded perspective view showing the parts of the device.

Fig. 8 is a fragmentary perspective similar to Fig. 6 but showing the parts in "open" position.

As can be seen from these figures the device is made up by a group of three pincers 1, 1', 1" each jointed round an axis 2, fixed in a box 3, which is itself fixed by a screw. Each pincer blade has a small part in the shape of a hook 6 engaging a follower 7 mounted to move axially of the vertical central axis of box 3, on which axis is mounted the screw 4 in opposition to a spring 8. When made to pivot around pivot pin 2 towards the exterior in order that the egg may be placed between the three pincers, the hooks 6 rise against the plate 7 and compresses the spring 8. The three pincers 1, 1', 1" being identical have hooks 6, 6', 6" all three of which coact with the follower 7, so that the displacement of one of the pincers results in an analogous displacement of the other two pincers. The spring 8, in the absence of extraneous restraint, has the effect of drawing the pincer blades together into egg clasping position. Some means, however, has been provided either to prevent the falling of the pincers in opposition to the spring, that is to say, to hold the egg fast after it has been put in position or to hold them apart in position holding the follower 7 up and the spring 8 compressed (position dotted in Fig. 3). This position decreases thus the space used when the empty and collapsed egg cups are piled up several deep.

For example as represented in Figures 2 and 3, a split ring 9 concentric to the box 3 is supported by its edge against the back of the pincers (Fig. 3) and prevents their slipping into the direction of the arrow F. This ring 9 is provided with three notches 10 which when they are placed opposite to the pincers 1 allow the downward movement in the direction of arrow F, Figure 3, that is to say, allow the opening of the pincers for the egg to be put in place. The notches provide a finger 11 passing over the lowered pincers to prevent them from rising, and thus assure the locking action of a bayonet type joint or slot.

Likewise a locking ring carrying three cams can be arranged co-axially with the screw 4 in the box and having the same purpose. This is shown in Figs. 6, 7, 8.

The supporting stand may have various forms, the saucer 5 being only one example of this stand which can as well be made with a light or heavy tray intended eventually, to hold more eggs side by side.

Finally several types of pincer blades can be used.

From the example represented there may be seen some different forms of the extremity of the pincers 1, 1', 1" a point 13 by means of which the shape of the egg is supported. These points will be preferably set perpendicular to the surface of the egg shell, and it can be seen immediately that in turning the egg with one hand the pressure on the shell will be increased by the pressure of the other hand the different points 13 will cut out this eggshell, the egg being then supported by the points projecting above the cut out part of the shape of the egg.

The points 13 can be made of any hard material such as tempered steel, tungsten carbide, diamond, etc. They could be fixed in the pincer by providing a slight enlargement for that purpose at the end of the pincer.

According to a modification represented in Fig. 5 the point 13 is replaced by a small plate with a sawtooth edge 13a set transversely to the plane of the pincer.

The pincers may vary in form from that shown in the drawings.

It will also be seen that the form of ring 9 shown in Figs. 6, 7 and 8 differs slightly from the form of ring 9 shown in Figs. 2 and 3.

The invention is not then limited to the form of manufacture described and represented.

What I claim is:

1. An egg cup comprising a cylindrical casing, at least three arms pivotally mounted at their lower ends in said casing at circumferentially spaced-apart points and extending upwardly from said casing, spring means acting on said pivoted arms for normally urging said arms into vertical position, said casing having a slot adjacent each arm to permit pivotal movement of said arms into horizontal position, said arms having a shoulder on an inner edge and a shoulder on an outer edge, and a ring rotatably mounted about said cylindrical casing, said ring normally engaging the shoulder on the outer edge of said arms for holding said arms in vertical position and having a slot cooperating with each slot in said casing for permitting horizontal positioning of said arms and an abutment engageable with the shoulder on the inner edge of said arms upon rotation of said ring for holding said arms in horizontal position.

2. An egg cup as defined in claim 1, further comprising a single spring normally urging all of said arms into vertical position.

3. An egg cup as defined in claim 2, wherein said single spring is disposed in said casing about the axis of said casing and cooperates with a rotatably movable member having a groove engaged by the lower ends of said arms.

4. An egg cup as defined in claim 1, wherein the upper extremity of each arm is provided with a cutting point for cutting the shell of the egg held between said arms upon rotation of said egg.

References Cited in the file of this patent

UNITED STATES PATENTS

| | | |
|---|---|---|
| 187,872 | Leprohon | Feb. 27, 1877 |
| 222,961 | Tattersley | Dec. 23, 1879 |
| 453,571 | Babbitt | June 2, 1891 |
| 463,604 | Iske | Nov. 17, 1891 |
| 521,613 | Hiller | June 19, 1894 |
| 1,246,624 | Lundahl | Nov. 13, 1917 |
| 1,720,115 | Barnes | July 9, 1929 |
| 2,613,518 | Karoff | Oct. 14, 1952 |

FOREIGN PATENTS

| | | |
|---|---|---|
| 14,262 | Great Britain | June 18, 1912 |
| 88,721 | Germany | Sept. 26, 1896 |